3,163,196
PREASSEMBLED FASTENER UNIT WITH
ELLIPTICAL THREADS
Walter M. Hanneman, Wheaton, Ill., assignor to Illinois
Tool Works Inc., a corporation of Delaware
Filed Apr. 3, 1961, Ser. No. 100,224
2 Claims. (Cl. 151—37)

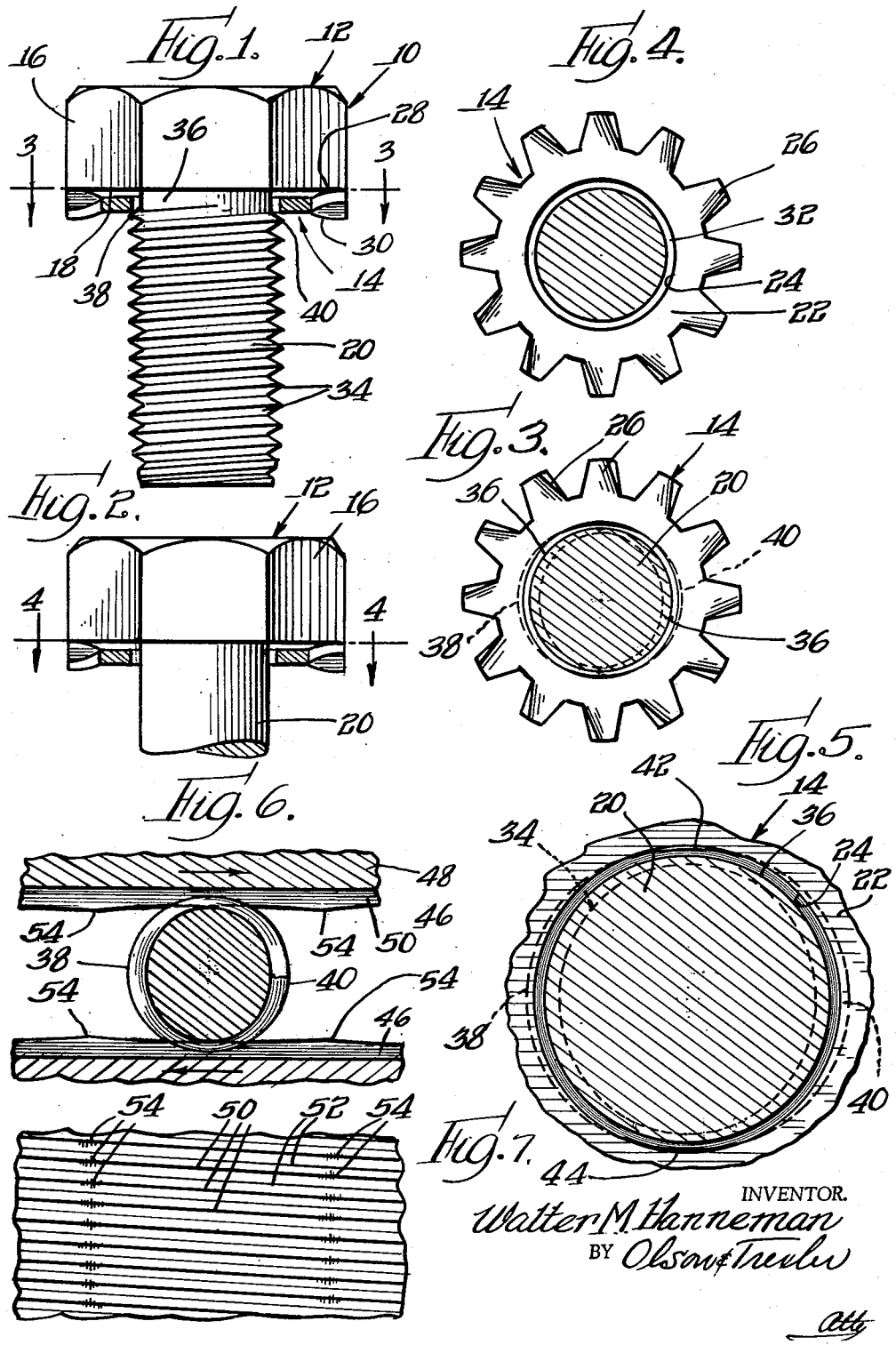

The present invention relates to a novel preassembled fastener unit and method for making the same, and more particularly to a novel preassembled fastener unit of the type comprising a screw and a washer telescopically associated with the screw shank.

An important object of the present invention is to provide a novel preassembled fastener unit and method of producing the same whereby the parts thereof such as a screw and a washer may be easily and economically assembled with each other and secured in such assembled relationship.

A more specific object of the present invention is to provide a novel fastener unit and method of producing the same of the above described type wherein increased clearances may initially be provided for facilitating assembly of the parts and subsequent relative rotation therebetween while at the same time, the parts may be securely retained in assembled relationship.

Other objects and advantages of the present invention will become apparent from the following description and the accompanying drawings, wherein:

FIG. 1 is a partial sectional view showing a unit incorporating features of the present invention in a finished condition;

FIG. 2 is a fragmentary view similar to FIG. 1, but shows the unit in a partially completed condition;

FIG. 3 is a sectional view taken along line 3—3 in FIG. 1;

FIG. 4 is a sectional view taken along line 4—4 in FIG. 2;

FIG. 5 is an enlarged fragmentary view similar to FIG. 4 and shows certain features of the present invention in greater detail;

FIG. 6 is a sectional view showing one step in the process of securing the parts of the fastener unit in assembled relationship in accordance with the present invention; and FIG. 7 is a fragmentary plan view showing a portion of the die structure used for carrying out the present invention and shown in FIG. 6.

Referring now more specifically to the drawings wherein like parts are designated by the same numeral throughout the various figures, a fastener unit 10 incorporating features of the present invention is shown in FIGS. 1, 3 and 5. The unit 10 includes a threaded rotary fastener member or screw 12 and a lock washer 14.

The screw member is provided with a head portion 16 which may be of any desired construction presenting a generally radially extending clamping face 18. A shank portion 20 extends axially from the head portion 16 and telescopically receives the washer 14. The shank portion is formed in accordance with features of the present invention described in detail below for retaining the washer in assembled relationship therewith.

In the embodiment shown for the purpose of illustrating the present invention, the washer 14 includes an annular body portion 22 having an inner margin 24 of predetermined diameter. A plurality of twisted teeth or prongs 26 is provided, which prongs extend from integral junctions with an outer margin of the body 22 and are substantially equally spaced therearound. The prongs 26 are twisted about their respective radial axes so as to present tooth edges 28 and 30 axially of opposite sides of the body portion 22 for engagement with the clamping surface 18 of the screw head portion and a work structure when the fastener unit is applied to the work structure. However, it is to be understood that various different types of lock washers may be utilized in the unit of the present invention, and such different lock washers might, for example, have prongs or teeth extending radially inwardly rather than radially outwardly.

When producing the unit 10 in accordance with the present invention, the washer 14 is telescoped over the shank 20 of the screw member while the shank is in a smooth or unthreaded condition as shown in FIGS. 2 and 4. It is to be noted that the internal diameter of the washer is substantially greater than the diameter of the unthreaded screw shank so that there is a very substantial clearance 32 between these parts. This substantial clearance greatly facilitates the alignment and telescopic assembly of the washer and shank portion 20 and subsequently promotes freedom for relative rotation between the screw and the washer during application of the fastener unit to a work structure.

In order to retain the washer in assembled relationship with the screw member, the shank portion 20 is rolled, in accordance with features of the present invention so as to provide helical thread convolutions 34 thereon beneath the washer. These thread convolutions are formed in the manner described in detail below so as to project beneath and retain the washer on an unthreaded portion 36 of the shank immediately adjacent the head portion clamping face 18.

As shown in FIGS. 3 and 5, the thread convolutions 34 are formed so that a first pair of diametrically opposite portions 38 and 40 thereof project radially outwardly of the surface of the unthreaded portion 36 of the shank and also outwardly of the inner margin 24 of the washer so as to underlie and retain the washer. However, a second pair of diametrically opposite portions 42 and 44 of the thread convolutions project radially a distance less than the projection of the thread portions 38 and 40 so as to lie within the inner margin 24 of the washer. In other words, the thread convolutions are formed so as to have a generally elliptical or oval transverse cross section as shown in FIGS. 3 and 5, which cross section has a major axis bisecting the thread portions 38 and 40 and greater in extent than the internal diameter of the washer. In addition the elliptical cross section has a minor axis bisecting the thread portions 42 and 44, which axis has an extent less than the internal diameter of the washer. With this structure, the thread portions 38 and 40 project sufficiently to retain the washer in a secure manner while at the same time the unthreaded section 36 of the shank substantially remains with a circular transverse cross section having a diameter substantially less than the internal diameter of the washer so that the washer remains freely rotatable relative to the screw member.

In order to produce the unit 10 in accordance with the present invention, the washer is assembled with the unthreaded shank in the manner described above whereupon the thread convolutions 34 are rolled on the shank with the aid of dies 46 and 48 shown in FIGS. 6 and 7. Each of the dies 46 and 48 is provided with a plurality of ribs 50 defining grooves 52 therebetween, which ribs and grooves extend generally longitudinally and diagonally of the dies. In accordance with the present invention, the crests of the ribs are hollowed out or dish shaped between spaced points 54 as shown best in FIG. 6. The distance between the points 54 is approximately equal to the circumferential extent of the roots of the thread convolutions between points defined by intersections of the major axis of the elliptical cross section with the roots. With this structure, the thread convolutions will be formed with the above described generally elliptical cross section when the screw shank is rolled between the die blocks 46 and 48. In order to accomplish the rolling operation, the screw shank is inserted between the die blocks in any suitable or known manner whereupon the blocks are relatively shifted with respect to each other in the direction of the arrows in FIG. 6.

While the preferred embodiment of the present invention has been shown and described herein, it is obvious that many details may be changed without departing from the spirit and scope of the appended claims.

The invention is claimed as follows:

1. A preassembled fastener unit comprising a screw having means presenting a clamping surface and a shank portion extending axially from said clamping surface, and an annular washer telescopically associated with said shank portion and disposed adjacent said surface, said washer including means defining a substantially circular inner margin having a predetermined diameter, said shank portion including a smooth unthreaded substantially circular section adjacent said surface having a diameter substantially less than said predetermined diameter, and said shank including helical thread convolutions extending substantially continuously axially outwardly from said shank section substantially to and entering end of said shank, all of said helical thread convolutions having crests which are continuous and generally elliptical in cross sectional configuration, one of said thread convolutions immediately adjacent said shank section having a major crest axis substantially greater than said predetermined diameter and a minor crest axis less than said predetermined diameter for presenting diametrically opposite portions thereof for engagement beneath said margin of the washer for retaining the washer on said shank section.

2. A preassembled fastener unit comprising a screw having a head portion presenting a clamping surface and a shank portion extending axially from said clamping surface, and an annular lock washer telescopically associated with said shank portion and disposed adjacent said surface, said lock washer including means defining a substantially circular inner margin having a predetermined diameter, said lock washer including an annular body section and a plurality of prongs circumferentially spaced around and extending generally radially from an edge of said annular body section, said prongs being twisted about their radial axes and respectively presenting tooth edges axially of opposite sides of said body section for engagement with said clamping surface and a surface of a work structure when the fastener unit is applied to the work structure, said shank including a smooth unthreaded substantially circular section adjacent said clamping surface having a diameter substantially less than said predetermined diameter, and said shank portion including helical thread convolutions extending continuously axially outwardly from said shank selection substantially to an entering end of the shank, all of said thread convolutions including continuous, uninterrupted crests having a generally elliptical cross sectional configuration, at least one of said thread convolutions immediately adjacent said section having major and minor crest axes respectively greater than and less than said predetermined diameter for presenting diametrically opposite portions thereof for engagement beneath said margin of the washer for retaining the washer on said shank section.

References Cited by the Examiner
UNITED STATES PATENTS

| | | | |
|---|---|---|---|
| 2,113,424 | 4/38 | Crowther | 151—37 |
| 2,289,066 | 7/42 | Olson | 10—10 |
| 2,343,798 | 3/44 | Poupitch | 10—155.5 |
| 2,352,982 | 7/44 | Tomalis | 151—22 |
| 2,414,870 | 1/47 | Harding | 151—22 |
| 2,672,069 | 3/54 | Mitchell | 151—37 |
| 2,779,376 | 1/57 | Poupitch | 151—37 |
| 2,946,039 | 7/60 | Grunwald et al. | 85—50 |
| 2,965,146 | 12/60 | Cox | 151—37 |
| 3,009,176 | 11/61 | Knocke | 10—10 |

EDWARD C. ALLEN, *Primary Examiner.*
CARL W. TOMLIN, *Examiner.*